US011748404B1

(12) United States Patent
Burnham et al.

(10) Patent No.: US 11,748,404 B1
(45) Date of Patent: Sep. 5, 2023

(54) COMPUTER VIDEO ANALYTICS PROCESSOR

(71) Applicant: Sighthound, Inc., Winter Park, FL (US)

(72) Inventors: R J Burnham, Winter Park, FL (US); Daniel Evers, Oviedo, FL (US); Markus Hahn, Santa Cruz, CA (US); Syed Zain Masood, Orlando, FL (US); Brent Richardson, Winter Park, FL (US); Jonathan Taylor, Maitland, FL (US)

(73) Assignee: Sighthound, Inc., Winter Park, FL (US)

( * ) Notice: Subject to any disclaimer, the term of this patent is extended or adjusted under 35 U.S.C. 154(b) by 369 days.

(21) Appl. No.: 16/903,284

(22) Filed: Jun. 16, 2020

Related U.S. Application Data

(60) Provisional application No. 62/862,572, filed on Jun. 17, 2019.

(51) Int. Cl.
| | |
|---|---|
| *G06F 16/00* | (2019.01) |
| *G06F 16/732* | (2019.01) |
| *G06F 16/783* | (2019.01) |
| *G06F 16/75* | (2019.01) |
| *G06F 16/78* | (2019.01) |

(52) U.S. Cl.
CPC ......... *G06F 16/7335* (2019.01); *G06F 16/75* (2019.01); *G06F 16/7834* (2019.01); *G06F 16/7867* (2019.01)

(58) Field of Classification Search
CPC .. G06F 16/7335; G06F 16/75; G06F 16/7834; G06F 16/7867
See application file for complete search history.

(56) References Cited

U.S. PATENT DOCUMENTS

| | | | | |
|---|---|---|---|---|
| 2004/0143602 A1* | 7/2004 | Ruiz | ................... | G08B 13/122 348/E7.086 |
| 2005/0271251 A1* | 12/2005 | Russell | .................. | H04N 5/781 382/103 |
| 2007/0166001 A1* | 7/2007 | Barton | ................... | H04N 5/781 386/230 |
| 2011/0295851 A1* | 12/2011 | El-Saban | .............. | G06F 3/0482 715/764 |
| 2012/0087573 A1* | 4/2012 | Sharma | .................. | G06V 20/52 382/154 |
| 2013/0287256 A1* | 10/2013 | Narasimha | ........... | G06V 10/435 382/103 |
| 2013/0336633 A1* | 12/2013 | Deever | .................... | H04N 9/87 386/241 |
| 2016/0192009 A1* | 6/2016 | Sugio | ................... | H04N 21/252 725/32 |

(Continued)

*Primary Examiner* — Syed H Hasan
(74) *Attorney, Agent, or Firm* — Haynes and Boone, LLP

(57) ABSTRACT

In a method of processing video images, a processor might obtain a video stream, select a set of processing pipelines from a plurality of processing pipelines, apply the set of processing pipelines to the video stream to obtain a data set of analytics data, wherein the pipeline analytics data for a processing pipeline of the set of processing pipelines comprises data about images of the video images, store the pipeline analytics data of each processing pipeline into a queryable data structure, receive queries from a user interface, and return portions of the video stream, or references thereto, in response to the queries.

27 Claims, 14 Drawing Sheets

(56) References Cited

U.S. PATENT DOCUMENTS

2018/0040083 A1* 2/2018 Bennett .................. G06Q 10/00
2018/0316947 A1* 11/2018 Todd ................... H04N 21/2665
2019/0075149 A1* 3/2019 Lu ........................... H04L 65/70

* cited by examiner

```
nodes:
   - type: "Entry"
     input: "in"
     output: "data"

- type: "Stage1"
     input: "data"
     outputs:
        stage1Output1: "stage1_out1"
        stage1Output2:
           stream: "stage1_out2"
     options:
        outputNames: ["stage1Output1", "stage1Output2"]

- type: "SideExit"
     input: "stage1_out2"
     options:
        isSink: true

- type: "Debug"
     input: "stage1_out1"
     output: "debug_stage1_out1"

- type: "Stage2"
     input: "debug_stage1_out1"
     output: "stage2_output"

- type: "Exit"
     inputs:
        endStageInput1: stage2_output
        endStageInput2: debug_stage1_out1
     options:
        isSink: true
        notify: true
`;
```

FIG. 7

```
nodes:
    - type: "VideoReader"
        output: "frames"
        options:
            file: "/media/input.mp4"

- type: "Classifier"
        input: "frames"
        outputs:
            objects: "allObjects"

- type: "JsonWriter"
        input: "allObjects"
        options:
            format: "json"
            method: "POST"
            url: "https://store.local/data"
```

FIG. 9

```
inputs:
    frames: "sourceFrames"
    metadata: "sourceMetadata"
```

FIG. 10

```
parameters:
    name: "FrameAnalyzer"
        inputs:
            frames: "inputFrames"
        options:
            postTo: "url"

nodes:
    - type: "Classifier"
        input: "${inputFrames}"
        outputs:
            objects: "allObjects"

- type: "JsonWriter"
        input: "allObjects"
        options:
            format: "json"
            method: "POST"
            url: "${url}"
```

FIG. 11

```
nodes:
    - type: "VideoReader"
        output: "videoFrames"
        options:
            file: "/media/input.mp4"

- type: "FrameAnalyzer"
        inputs:
            frames: "videoFrames"
        options:
            postTo: "https://store.local/data"
```

FIG. 12

COMPUTER VIDEO ANALYTICS PROCESSOR

CROSS-REFERENCE TO RELATED APPLICATION

This application claims the benefit of U.S. Provisional Patent Application No. 62/862,572, filed Jun. 17, 2019, the disclosure of which is herein incorporated by reference in its entirety.

FIELD OF THE INVENTION

The present disclosure generally relates to computerized image and video processing. The disclosure relates more particularly to apparatus and techniques for performing image analysis and querying processed image and video databases.

BACKGROUND

In various fields, there is interest in annotating images, or videos comprising frames of images, based on objects present in the image or frames. This might be done manually, but that can be labor-intensive. Computer-based processes for automated or guided processing to derive annotations can be complicated and improvements might be desirable.

SUMMARY

In a method of processing video images, a processor might obtain a video stream, select a set of processing pipelines from a plurality of processing pipelines, apply the set of processing pipelines to the video stream to obtain a data set of analytics data, wherein the pipeline analytics data for a processing pipeline of the set of processing pipelines comprises data about images of the video images, store the pipeline analytics data of each processing pipeline into a queryable data structure, receive queries from a user interface, and return portions of the video stream, or references thereto, in response to the queries.

The method might include a processing pipeline of the set of processing pipelines outputting object analytics data representing objects identified in the video images.

A method of synchronizing two or more video streams might be provided, comprising obtaining a plurality of video streams, using an analytics processor having a correlation stage to identify similarities among the video streams of the plurality of video streams, distill cross-populated information that associate at least one frame from at least two video streams and relate to location and/or time of video capture of the content of the at least two video streams, compute confidence degrees for the cross-populated information, and process a mesh of cross-populated information to increase confidence degrees of the cross-populated information.

The cross-populated information might correspond to a presence of a person in each of the at least two video streams. The cross-populated information might correspond to a presence of a timepiece in each of the at least two video streams. The cross-populated information might correspond to a presence of sounds or speech that occur in each of the at least two video streams.

A method of processing data might be provided, comprising representing references to video inputs using a markup language, representing actions to be taken on the video inputs, wherein the actions are represented by data stored in a data object in the markup language, processing the video inputs according to the actions, passing data to detectors and classifiers according to a node structure represented in the data object in the markup language.

The markup language might be organized as a graph of nodes and edges, with edges connecting nodes and an edge representing an output of one node to which the edge is connected and an input of another node or inputs of nodes to which the edge is connected. A node might comprise a nested graph. The graph might include terminal nodes that correspond to physical processes. The physical processes might include a data transformation process that might be performed by a processor that is processing a markup language file, wherein at a runtime a pipeline execution engine receives a graph of nodes.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 7 illustrates a synthetic DFML example.

FIG. 9 illustrates an example of a DFML data structure that might be stored in memory and/or processed by a data processor.

FIG. 10 illustrates another example of DFML, including multiple inputs with one named slot.

FIG. 11 illustrates an example of an embedded workflow.

FIG. 12 illustrates a use of a node in a higher-level document.

DETAILED DESCRIPTION

Figure 1:
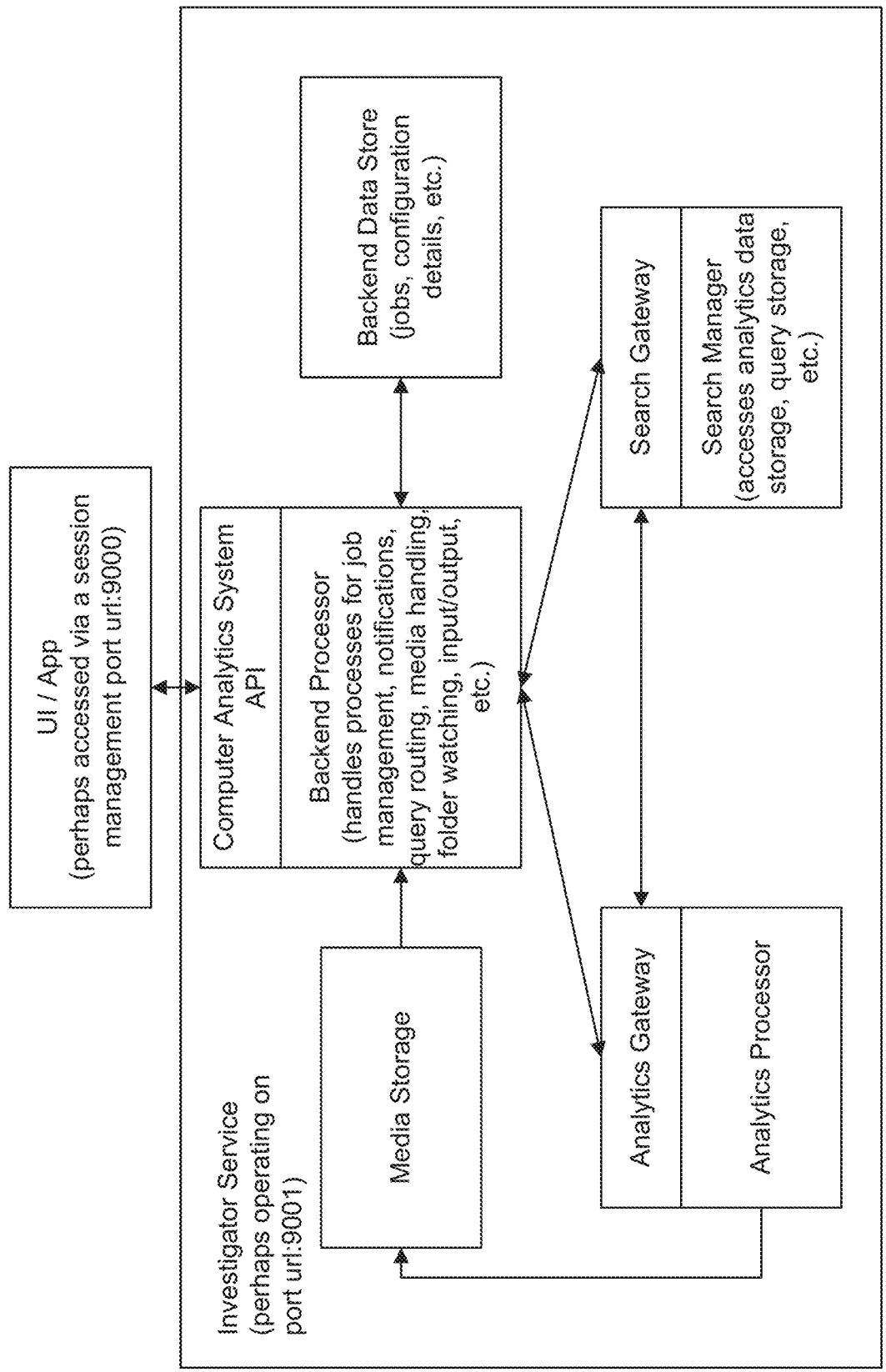
FIG. 1 shows a block diagram of a processing system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include processing images or videos to derive analytics data. As used herein, an image might be a data structure representing pixel color values at pixel locations, possibly as a two-dimensional or three-dimensional array of pixel locations. As used herein, a video, or video sequence, might comprise video frames, each of which might form an image or a part of an image, interlaced or not, that are data structures usable for presentation in a timed sequence, often referred to as a frame rate.

An image or video might be presented to an image processor as described herein in the form of prefetched data or in the form of a stream of data that is processed as it is received. In some cases of prefetched data, the entirety of the data is available at the start of processing, but that need not be the case. In the typical case of streaming, the data processing starts before all of the data is received.

The sources for analytics can be stored in various forms and processed directly or by reference. For example, the input to the image processor can be a data structure or file representing a video, from storage or via upload through a web browser, or perhaps one or more URLs pointing to video files, to be downloaded by the image processor. Other examples include RTSP URLs for constant monitoring, and optionally recording, references to cloud-storage objects, perhaps fed from a monitoring process that runs and watches a file system for new videos to appear and to be processed. The image processor might make a copy of the data and optionally convert it.

Image/video storage might be in the form of images or video frames, uploaded by a user or by the image processor, having a definite or known length, or otherwise. Various formats might be supported, such as H.264/AAC formats. For security video and other types of recordings, the storage might be for a set of clips per source, with older ones overwritten as space is needed. Images might be thumbnails or single frame video captures. There might be multiple independent queries referencing a single stored image or video.

Unless otherwise indicated, processing and examples described with reference to an image also apply to a frame of video and vice versa.

Analytics data for an image represents data that relates to information extracted from the image and/or metadata present in the data structure that embodies the image. Analytics data might include a plurality of bounding boxes, wherein each bounding box might be represented in the analytics data in the form of pixel array coordinates for a bounding box that surrounds the portion of the image that shows an object associated with that bounding box, and perhaps a label or labels to identify the bounded object.

Analytics data for a video sequence can be constructed by combining the analytics data from image frames. Objects recorded in the analytics data for a frame can be tied together with objects observed in neighboring frames (across time) using object characteristics (e.g., spatial proximity, label match, etc.) These object-to-object connections might be stored in memory as "object tracks" where an object track might represent a similar object found in several frames and thus grouped together across the time domain. Additionally, track information can help to make better/informed decisions on the object labels (for example, make/model/color/class of a car) using a weighted average approach on labels from all frames in the object track.

As an example, a bounding box might be stored with data for a lower left corner in pixel coordinates (230, 150), an upper left corner in pixel coordinates (400, 216), a type label (e.g., "face," "car," "address," "roadway,"), and characteristics of the object, possibly specific to the type label, such as the name of the person where the object is a face, the make/model of the car and the class of the car (e.g., sedan, SUV, coupe, etc.) when the type label indicates a car, the track information associated with the car (when it was first seen to when it went out of view), association of a license plate with the car (if visible/readable), etc.

Computer Analytics System

FIG. 1 illustrates a block diagram of a system.

Figure 2:
FIG. 2 shows examples of user interfaces as might be used for performing queries.

FIG. 2 illustrates some screenshots.

Figure 3:
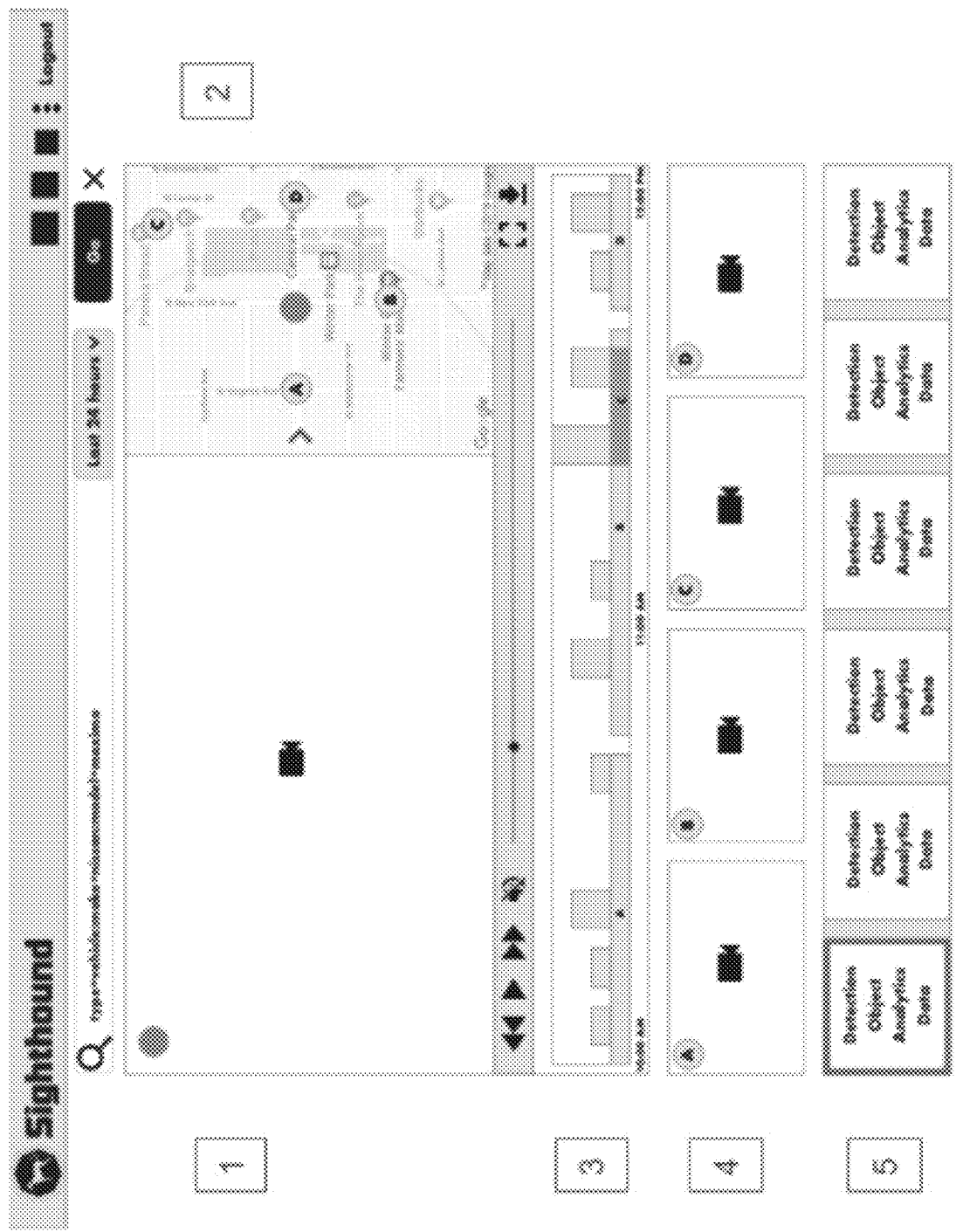
FIG. 3 illustrates an example user interface.

FIG. 3 illustrates an example user interface 300. In that user interface, a primary video (1) is presented, along with a map (2) showing static and moving time-based markers. A timeline (3) is presented with bars representing the number of objects/events found for the given search and timeframe. The wider bars (labeled A, B, C, D) might represent source videos relevant to the search and where they fall on the timeline. Particular processing might be done on various images to identify their timestamps and their time of capture.

Multiple videos may overlap. Element 4 in FIG. 3 might include additional videos that contain objects/events from the search query or that were determined to be relevant to a search query by other programmatic means. A scrollable list (5) of cropped images and textual metadata that were extracted from the videos that matched the search query might be presented.

For example, if a user searched for "type=licenseplate," perhaps the only images that were presented would be those having analytics data associated with them where the analytics data indicated that a license plate is present in the image. A more specific search might be for type=licenseplate and characteristic="XYZ123" so that only images that have analytics data that include that type and characteristic of that type are presented. For license plates, another characteristic that might be extracted is the issuing jurisdiction (state, etc.) of the license plate.

The above search can also be expanded to search across multiple categories based on some search criteria or upon the user selecting more than one option in a single category. For example, a user can limit the above example search of "type=licenseplate" and characteristic="XYZ123" to only specific car classes (e.g., "type=car" and classes="sedan, suv"). This would limit the specific license plate search to only cars that are either classified as sedans or SUVs.

A computer analytics system might comprise (1) an analytics processor that processes images and/or video to extract the analytics data and store that into a database or other data structure, (2) a backend processor (which could be a single engine or a distributed engine or service or server), and (3) a UI component. The analytics processor might run computer vision pipelines, yielding analytics data, wherein the input might be images or video frames. The backend processor might be configured as middleware to fetch and assign video data to one or more analytics instances, collect and store the result data, and offer querying. This might be for a single machine or a distributed process. The UI component might be implemented using web tools, such as to run in a browser or (if desired) alternatively as a desktop application, connected to the backend processor.

Example Use Case

Assume a client-server solution running and accessed through a web browser. A customer might open the UI component, log in (if credentials are required), and select an import source. The import source might be a local file system, where the actual server runs. Other embodiments might use a cloud object storage location, or an API endpoint where data (such as a list of videos and their corresponding URLs) gets fetched from. The computer analytics system might implement a watch system that monitors changes and offers notifications of changes. The watch system might follow particular directories in a file system. The importer and watch system might be part of the analytics processor.

The backend processor might create job objects and process those job objects. A job object might contain the information needed to iterate over sources and, optionally, get more data added when the watch mechanism detects new matching files showing up. Jobs end when the initial iteration stops and a user is not watching, or when they get stopped explicitly.

The analytics processor will fetch one or more streams. Where the video for the stream is not from a local file source, local copies might be made. The backend processor maintains a work queue for the files that need to be processed. For each file to be processed, the backend processor sends a video request to the analytics processor to run one or more specific analytics pipelines. The analytics processor does not need to run all of the pipelines, and can invoke specific pipelines as needed depending on what the video is being analyzed to find. The backend processor might keep track of the requests so as to not overload the analytics processor.

The analytics processor runs a pipeline instance for a particular video and returns the analytics results to the backend processor, perhaps over a duplex messaging connection, or into a file where all of the data is written and then consumed by the backend processor. Things like progress updates might go exclusively over the analytics processor API, which can also be used to query the status of running pipelines.

The analytics data might be streamable and comprise small units of frame and object data updates, which can then be used by the backend processor to form higher level logical entities such as tracks and consolidated object information.

As the raw analytics data is received, the backend processor can either store it as such or use it to populate a database with aforementioned derived data ready for querying. This might depend on the actual vision application or customer demand. Some of the analytics pipelines might include processing for object identification (identifying locations, types, characteristics, etc. of objects present in the video).

Objects might tie frames together to form tracks. In other words, the analytics processor might identify objects in unrelated videos, note that they are the same object and then associate those unrelated videos as showing a common object.

Once persisted in the database, queries/searches/lookups can be run from the UI component. In some cases, the media is presented in the UI component, but this is not required. Using the UI component, a user might enter queries such as "list all detections of license plates containing the letters 'AB' on red cars," yielding the actual detection time and media origin.

Time and Time/Location Meshing

Media data can be addressed via timestamps embedded in streams or containers, a detection of a "wall clock" real-time capture time for a frame, and/or frame numbers, or other media-relative times. This might require some adjustments for pipelines that yield frame numbers as output. Resolution could be in microseconds or fractional values.

In some applications, it might be useful to be able to identify a wall clock time of an image and/or a location. While one image might have only low resolution data for time and location, using a mesh process as described herein, more accurate values might be obtained.

The analytics engine might have two core data entities: sources and analytics data. The sources could be media files such as video files and streams plus the metadata gathered from such, optionally annotated by users. The analytics data might be whatever is detected by the analytics engine, such as computer vision (CV) information, such as objects (people, cars, . . . ) and their appearance in the media (for video, e.g., where they are seen in each frame). Detection data can be detailed, not only that a vehicle is found, but also its color, make and model and so on.

Finding an object across different sources and correlating such information provides value to end users, such as for law enforcement finding a specific car through a witness report ("white Toyota SUV"), getting its license plate from the first reasonable match, looking for the potential driver in subsequent camera feeds in an assumed area or if she has been seen on body camera video afterwards without an officer knowing about the suspect.

Not all sources yield perfect time and location and in those instances, the analytics engine might provide a new way to fill in the missing pieces, within a certainty sufficient enough to yield useful results.

An example of this is a multi-step process that comprises the following steps:

1. The analytics engine reads in source media and identifies the media's metadata and extracts it from the media container, e.g., Exif data or GPS data streams of action or body cameras.

2. The UI component accepts user annotations of the source metadata. For instance, the UI component might provide for the user to input a timestamp and/or a location explicitly.

3. The analytics processor can extract time and location by particular processing, such as detecting clocks on a wall, coarse morning/afternoon night time determination, recognizing specific buildings (of a particular city) and so on. This can be done with the object analytics that are performed to identify objects or can be done separately.

4. The analytics processor might include a correlation stage where similarities in different sources are detected and used to cross-populate location and time information. For instance, if a person occurs in two different videos and her occurrence is similar enough, a weighted link between these two spots in time and location can be made. This facilitates in filling in missing information, like a formerly unknown location is now determined with a certain degree of confidence. Over time, this builds a mesh that can then be used to not only locate objects, but also to pinpoint them as best as possible. Such a mesh link might not immediately lead to an absolute time or location spot if both sources don't have any of such, but other matches might then complete the picture eventually. It might be that a reviewer is already content by having found multiple sources regarding one specific search item.

Sources can be media in general, such as video and audio and perhaps even auxiliary data such as sensor information (e.g., door open/close signals). The correlation stage might use different techniques such as CV or audio/voice/phrase matching to create associations.

Figure 4:
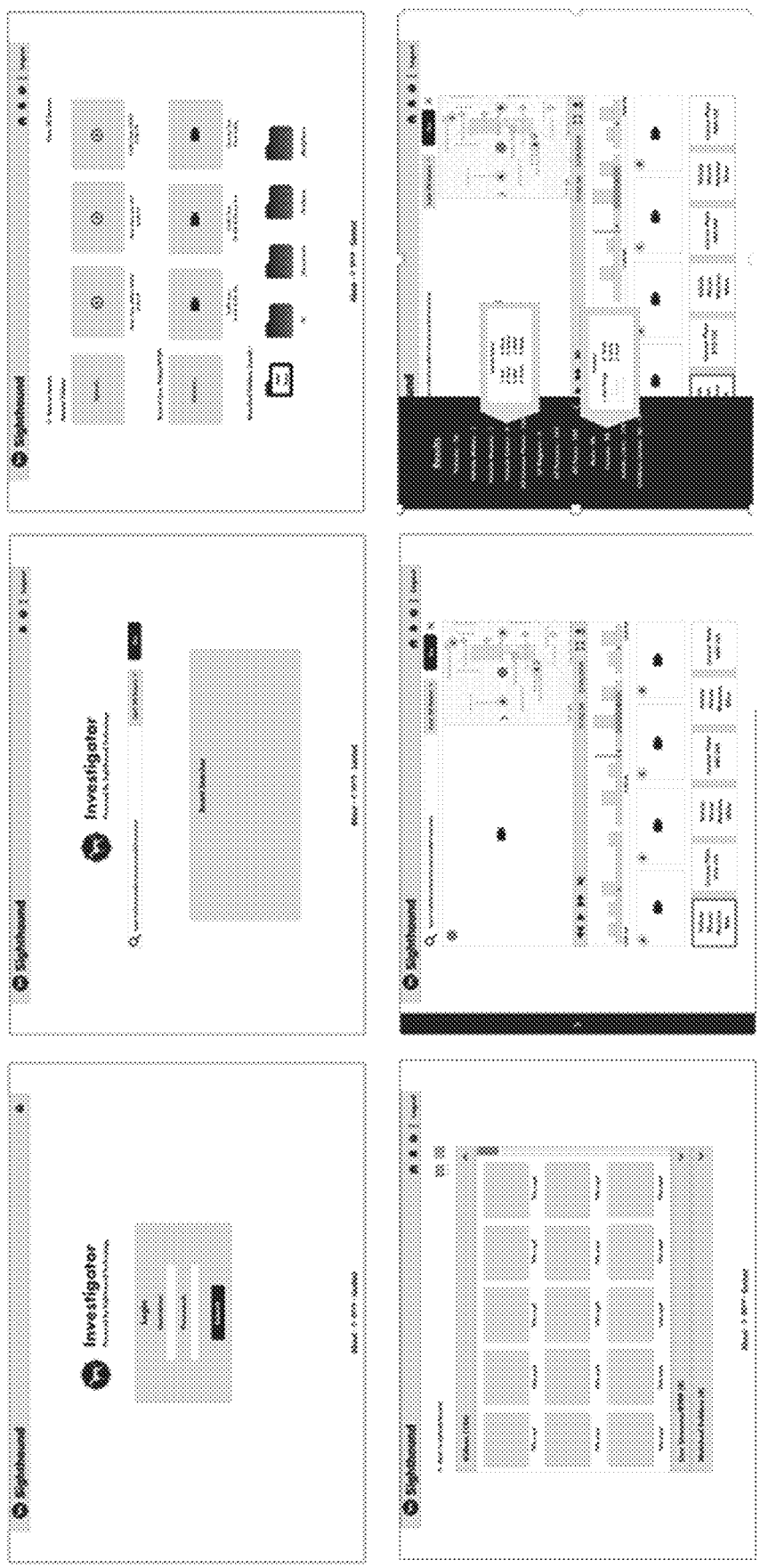
FIG. 4 illustrates another example user interface.

FIG. 4 illustrates an example user interface.

Example of Mesh Linking

Figure 5:
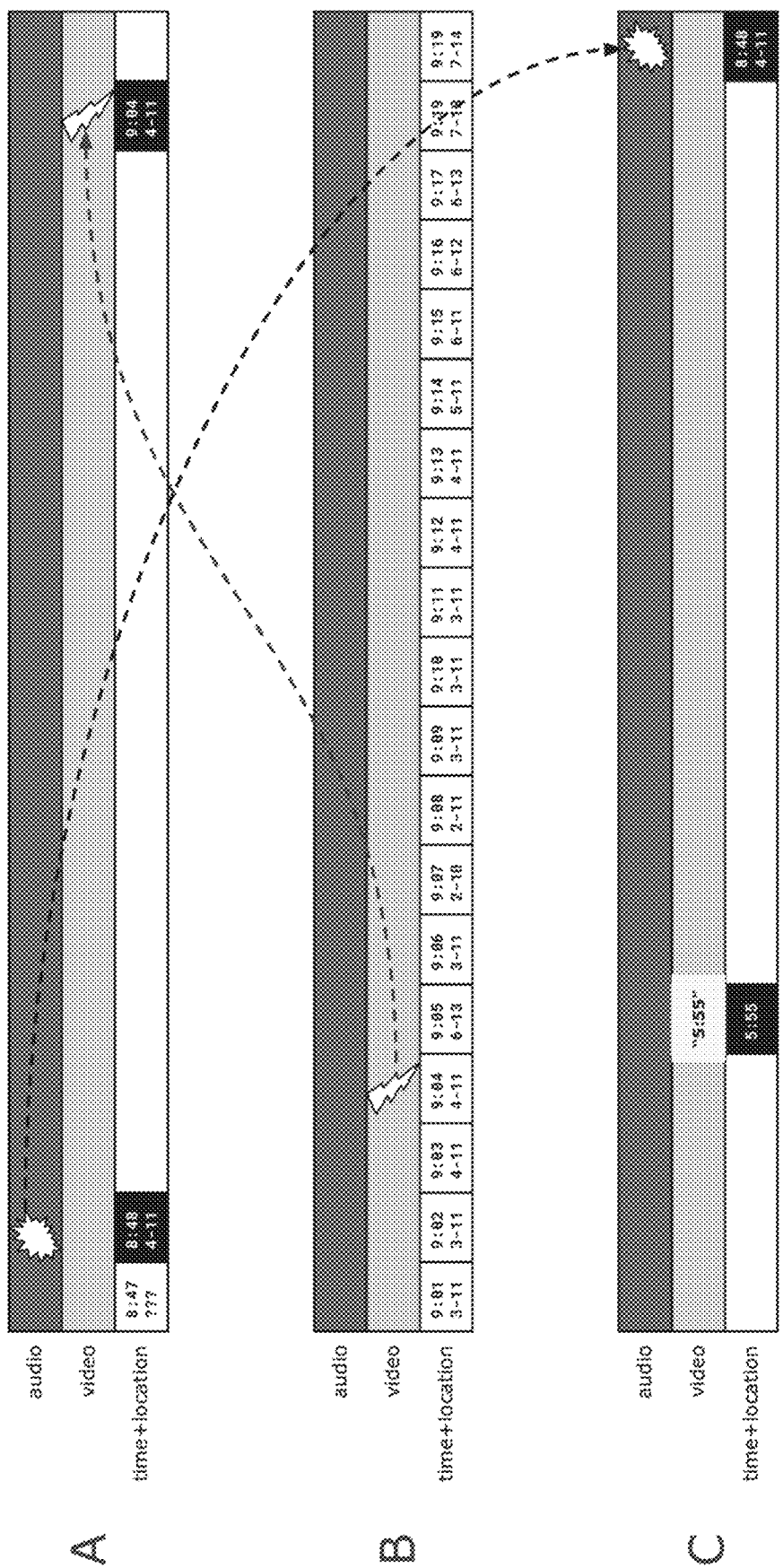
FIG. 5 illustrates a process of mesh linking.

As illustrated in FIG. 5, the analytics engine might process three sources of media, labelled "A," "B," and "C." In this example, source A provides a timestamp via Exif data. Source B has a metadata stream with ongoing GPS location data and clock timestamps embedded. For the sake of simplicity, the location format is abstracted in the figure. As illustrated, source C has neither any start time nor location data. Analytics run over source C might find a wall clock showing the time 5:55, which the analytics also identified an object (represented in the figure as a "flash"

symbol) in both source A and source B. This provides at least one location entity for the whole duration of A (periods 4-11). Suppose further that the analytics processor finds a correlation of an audio footprint appearing in source A and source C (represented in the figure as an "explosion" symbol), so the analytics processor can then assume that C is at or close to the location originally learned from B. Then, the time (5:55) learned in the analytics stage is a matter of heuristics (e.g., the time distance must match in a reasonable range).

Figure 6:
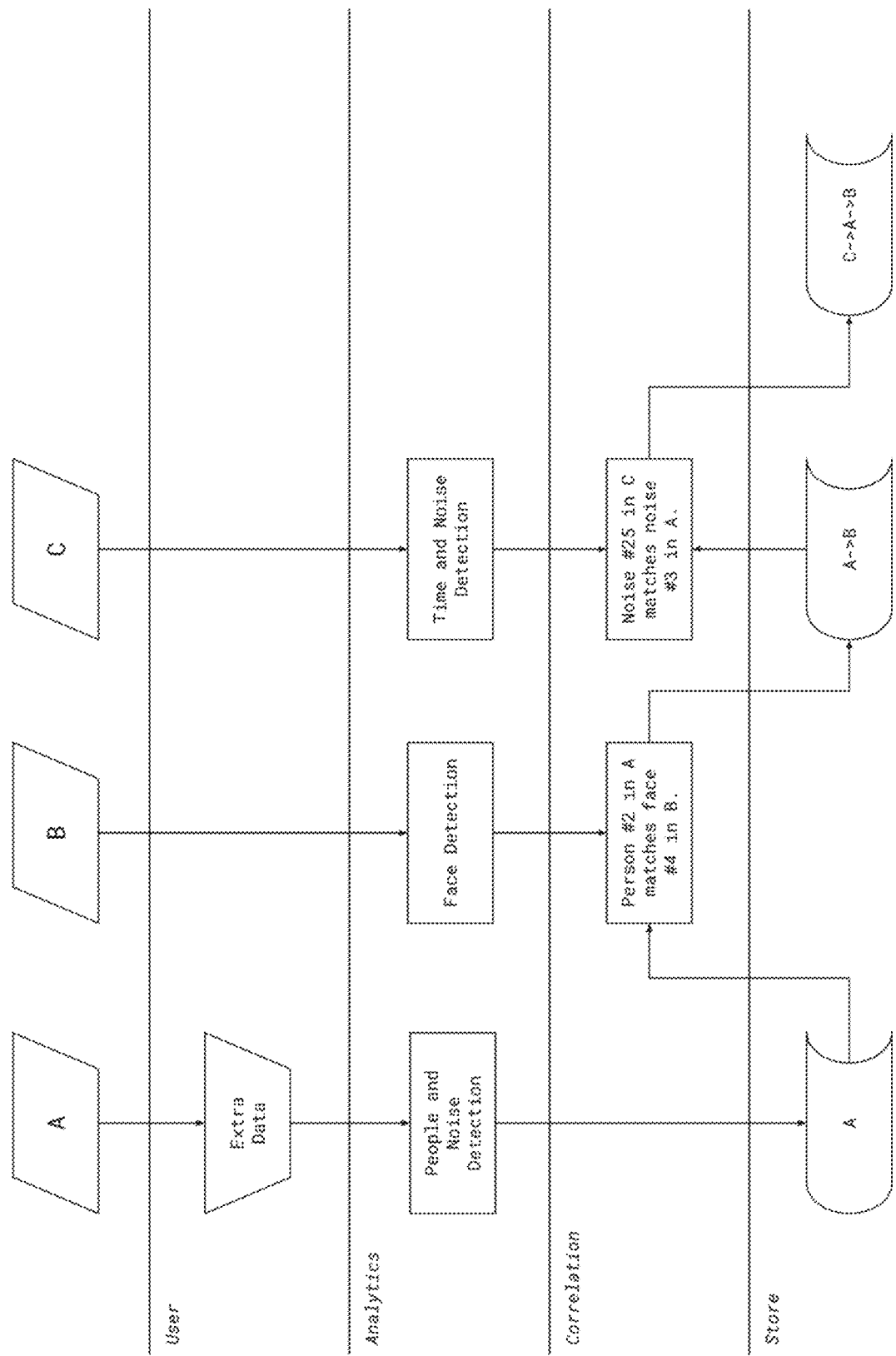
FIG. 6 is a swim diagram of a process for mesh generation.

FIG. 6 illustrates an example of mesh generation. Over time, and with more and more detections and correlations, the mesh gets denser and the quality for location and time awareness rises.

Backing

The analytics data can be maintained in common files. Scaling can matter. Rather than going with some more abstract object storage and having to deal with things like synchronization and providing pipelines with copies, a distributed file system with POSIX access might be used. The underlying operating system might impose some constraints.

File Organization

To assist with coordinating multiple independent pipelines using common storage, files that the image processor stores, such as capture video that is to remain associated with analytics data might be stored using UUIDs (128-bit random numbers) assigned to each source as a source ID (SID), assigned at the earliest point in time, possibly even before the content is acquired. When stored in a file system, file identifiers might be used that correspond to the source IDs. Storage can be optional and might not be used when mesh correlation is performed.

The SIDs can be spread out for quicker lookup using a directory tree that is several levels deep. The original file names, where applicable, could be stored as meta data or analytics data, perhaps in a database where jobs get registered (or in accompanying metadata). These SIDs might be unguessable.

For example, given the SIDs:
c0d264cf11b70285cd5c150c7110fc57
0ac63647eec10d4fb840cfd2e56a77ef, and
ee6659d45178d83a0a193d12f40c6b74
they might be stored in directory entries
/storage/videos/0a/c6/3647eec10d4fb840cfd2e56a77ef,
/storage/videos/c0/d2/64cf11b70285cd5c150c7110fc57, and
/storage/videos/ee/66/59d45178d83a0a193d12f40c6b74.

For recordings of real-time streams, the backend processor might use a slightly different approach. For a typical temporary storage processing system, only so many segments might be maintained before rotating out older material. In such a case, the SID might present a directory for a particular stream, which then holds a certain number of recordings, with the file names being the timestamps (in microseconds), for easier location. Playback or cleanup logic can then quickly down and, without any additional index, find the parts it needs. For example, if the recording SID is 2b97412efd85f9d80b87511d225d2ca1 then the storage locations might look like this:
/storage/recordings/2b/97/
412efd85f9d80b87511d225d2ca1/1551241196051721.mp4
/storage/recordings/2b/97/
412efd85f9d80b87511d225d2ca1/1551241496051569.mp4
/storage/recordings/2b/97/
412efd85f9d80b87511d225d2ca1/
1551241796051960.mp4.

The DFML Data Flow Format

The dataflow markup language (DFML) described herein can be used for data storage of various data objects and process instructions for various workflows. An example workflow might be the processing of video sources and allowing for searching of those video sources. The whole flow of data, from intake from sources (video), passing it to detectors and then classifiers, accumulating the analytics data in special data processing nodes, to then finally yielding data such as media derivations or real time alerts, can all be done with data and procedures stored as DFML objects, such as DFML files or data structures. One base format for DFML is YAML, to define the whole flow of data, from intake from sources (video), passing it to detectors then classifiers, accumulating the analytics data in special data processing nodes, to then finally yield any kind of data such as media derivations or real time alerts.

A DFML data structure is organized as a graph of nodes and edges, with edges connecting nodes and an edge representing an output of one node to which the edge is connected and an input of another node or inputs of nodes to which the edge is connected. Such graphs can also be nested, as a node itself might comprise an entire graph of nodes comprising a more complex logic.

On the bottom are nodes that correspond to physical processes, such as data transformation processes (e.g., running DNNs, frame conversion, etc.) that might be performed by a processor that is processing a DFML file. At runtime, a pipeline execution engine receives a graph of such nodes, creates them and then lets the data flow through. This data trafficking can be done by a scheduler that takes care of passing pieces of data from outputs to inputs.

There can be a need for potentially complex data flows beyond pure pipeline runs, such as acquiring sources, converting them, running analytics/pipelines, taking that output and feeding it to further processing stages for the purpose of altering, storage or even triggering other workflows.

The DFML format can also be used for description and an execution primitive to drive the flow of data. Some references can be referential, such as a conversion node that receives as its input an identifier to load, converting the referenced object and storing it back onto the media material.

The DFML Data Flow Format has an advantage in that it allows for a platform and implementation neutral description, where several manifestations can still be described in an overall context. Additionally, the DFML data structure format is more readable, as it provides a structure of how information is processed in modules (nodes) and how each module is connected with and shares information (edges). This node-based structure can provide clear separation of self-contained processing modules and indicate how they interact with each other for specific tasks. It is thus a very manageable and readable approach to representing data across various platforms.

FIG. 7 illustrates a synthetic DFML example. As shown there, the inputs and outputs are connected in the graph. The "type" field of each node indicates the nature of the object is. Here "Entry" is the source node and "Exit" the sink, where data finally terminates. "Entry" could get data from web requests and "Exit" could write things to a database.

Note that in the above example "SideExit" is also a sink node. "Debug" node is a common throughput node—here it logs all of the data passing. A node can have multiple outputs, each of them with different kinds of data. Same multiplicity for the input nodes.

In this example, the actual linking between outputs and inputs is done via textual identifiers such as "stage1_out" or "data." Nodes themselves can be configurable via options, depending on how the behavior needs to be adjusted. In the example shown, the "Exit" node is told via the "notify" option to send an internal message each time it receives data. Another example would be to pass a URL to a video stream reading node, or a file name to a node that emits JSON presentation of structured data it receives. In other examples, some nodes might relate to sub-pipelines with high-level workflows to delegate things such as analytics through a node, but not exclusively, of type "analytics."

An end user could load one or more related DFML files into the analysis processor, having the entire processing graph being based on the same description language. The parser in the analysis processor might even be able to extract pipeline YAML and pass that portion to a pipeline execution engine seamlessly.

Another layer might be present above the layer of jobs defined by DFML, with those upper layers indicating delegation of requests to a "job" node. This nesting can go to arbitrary levels. The execution of DFML depends on which level is running at the time. Analytics pipelines, e.g., might execute through a low-level C++ implementation, while job node executions might be driven in a Node.js environment.

Figure 8:
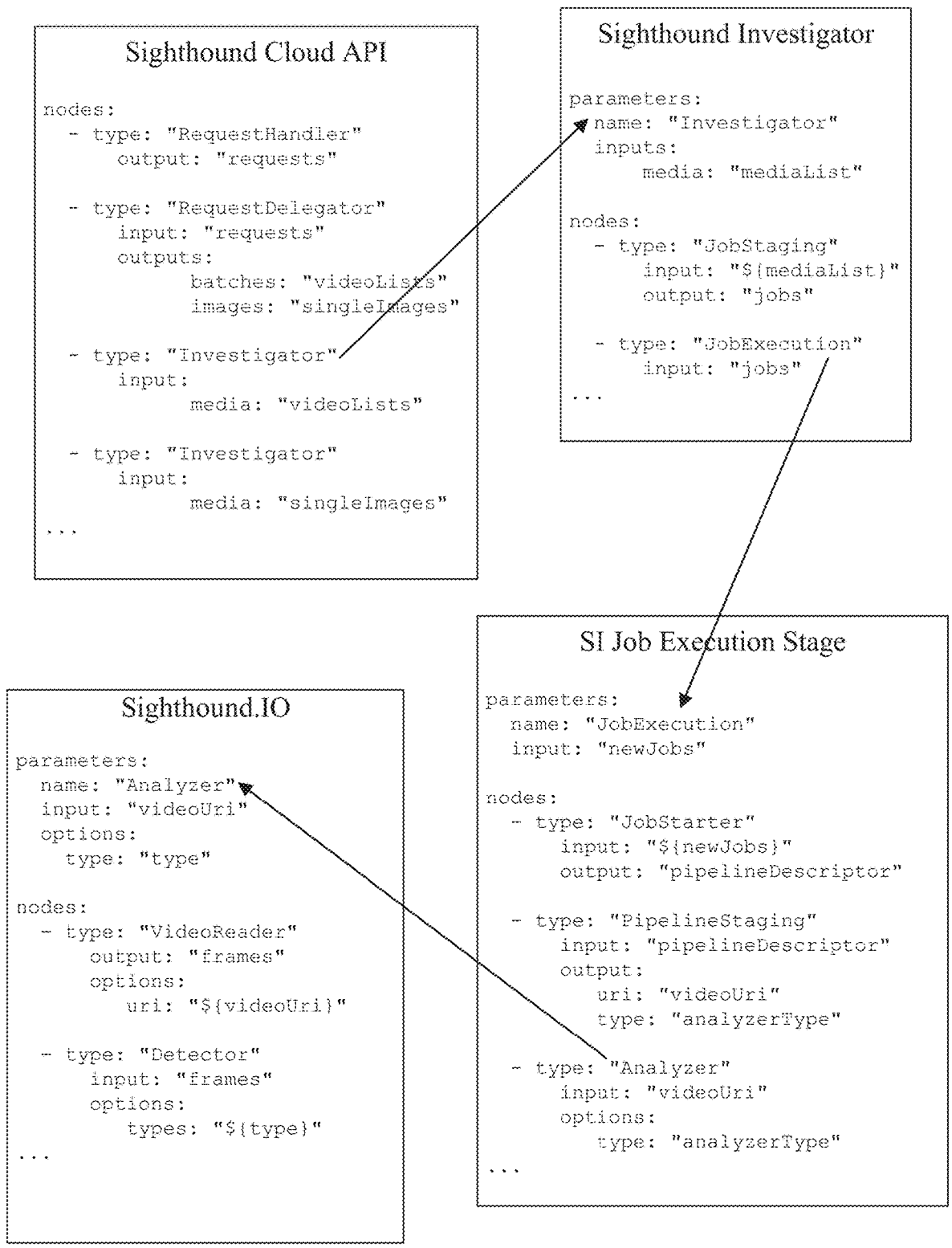
FIG. 8 illustrates an overview of DFML being used.

FIG. 8 illustrates an overview of DFML being used. As shown there, with DFML a designer can use one format to describe various parts of a workflow from the very top (request from a cloud API) to the very bottom (the analytics stage in the analytics processor) without the need for any intermediate stages of translating or reinterpreting. Nesting as shown is possible, but there's also the possibility to fork certain structures or use DFML in a detached system in an isolated manner.

Example of Using DFML

DFML data structures might be used as a universal description format, representing pipelines for arbitrary workflows and the like. These workflows could be for computer vision pipelines, but have other uses covering a vast spectrum of applications. One feature of DFML is that it allows domains to be declared jointly, using nesting.

DFML can also be used to automatically generate code blocks in a procedural programming language, such as the C++ language, which blocks could then be compiled. This is one specialized use of DFML. Loading and interpreting its data structures is another use. In one implementation, the YAML markup format is used, but different formats might be used. In this description, examples use YAML, but it should be understood that other formats might be used.

In a basic implementation of a processing system that uses DFML for structuring data, a DFML data structure can describe the flow of information among different processing nodes, with each node having multiple inputs and outputs and the DFML code can include elements that represent options for configuring each node's behavior and linking between nodes using "named slots." Cyclical or feedback linking is permitted. Enforcement of constraints such as a requirement that graphs be directed and acyclic is not required. Whether or not the flow of data makes sense or having the result being unstable is an implementation's choice.

Some nodes are sources and some nodes are sinks, so they are outputs or inputs, respectively. FIG. 9 illustrates an example of a DFML data structure that might be stored in memory and/or processed by a data processor. In the DFML document of FIG. 9, it describes a simple pipeline, where the VideoReader node reads a local video file and emits frames on the frames output. The next connected node Classifier then performs CV (computer vision) analytics and emits the objects it finds on the allObjects output. The objects are in private data structures consumable by nodes that know how to deal with such data structures—so the structure or type of data flowing between nodes is unlimited. Each node can decide whether or not it accepts the data arriving on a certain input. Some nodes can even convert to more common forms, like strings, and still do meaningful work. Here the JsonWriter node takes in all of the objects' data and submits that data to a REST endpoint via POST requests. All this is declared in the options as "format," "method," and "url."

The naming of inputs and outputs can be of any string kind—where the names match a stream will be established. It is also possible to have one output feed into multiple inputs—a single input on each of multiple nodes. This is not a specific feature of certain nodes, but instead is universally available.

Data does not have to flow between nodes in immutable form and nodes do not need to be "pure," i.e., without any side effects. The implementation determines whether such rules are desirable.

In this example, the format of a node follows some rules, such as that every node has a type string, where the name of this type is global and represents a specific implementation, and another rule that inputs are declared as a single input slots (as in FIG. 9) or multiple inputs with one named slot each, as in FIG. 10. Outputs are declared as a single output slot or multiple outputs or multiple outputs with one named slot each (same format as inputs).

Options can be declared as multiple options—even if only one is listed—with one named slot each. Options might be free-form YAML markup language objects. Options are not required on a node implementation.

An overall collection for all nodes is the top-level nodes object, as it is usually presented in the root of a DFML document. The order of the nodes themselves, or any order in general, need not be relevant.

FIG. 11 illustrates an example of an embedded workflow. One feature of DFML is its ability to include other documents or workflows respectively, and then using those sub-structures to delegate work, or hide away complexity, or just make certain portions reusable. In the example of FIG. 11, the analytics and output portion of the DFML are reusable. Using the parameters section, the same-level nodes collection will be declared as a node type itself in the global namespace. In this case, the resulting type is FrameAnalyzer. An option is declared for it to provide the output URL. Using the ${NAME} format, those options will then be made available from the embedding code. A similar declaration is used for the inputs, which are then linked to the inner node—in this case inputFrames input of the FrameAnalyzer node links to the Classifier node.

FIG. 12 illustrates a use of this node in a higher-level document. Note that for a sub-node, the outputs can be linked with an approach similar to the inputs in the above example, although in this example the JsonWriter is a sink node and does not provide any outputs.

Conversion

A media conversion process takes acquired material and checks if its format is something supported. If not, a conversion process might be triggered, perhaps via some video conversion tool. This can happen in a detached manner, from any upload request or after fetching some file.

A worker pool might be used for these kinds of tasks. The initial implementation could be based on the npm module workerpool, combined with an exchangeable queue solution. In another implementation, there are two worker pool types, one for CPU-bound tasks such as video conversion (usually one file keeps all cores busy) and one for other things such as I/O, e.g., file acquisition or storage cleanups.

Example Upload

For an example upload, a request might come in for a single file upload, either over HTTP or via websockets streaming for easier progress reporting. An SID is created and the file gets stored in a storage directory (e.g., "/storage/ . . . " as described above), perhaps with an extension to mark it as "in progress." If needed, the process computes a checksum while the data is written. Once the upload ends, the SID is returned in the response and a conversion task is scheduled. The conversion task receives the SID. A "workerpool" process executes the conversion task, which might take minutes to complete. If the original file can be kept, it can end very quickly. If converted, the new material might replace the old material. Renaming and/or deleting can yield the final result. Before it ends, the task might send a notification, so the caller knows that analytics can commence for that particular SID. The caller may also poll on the SID finally being available in storage via an investigator API.

Fetching

A request can be sent with a URL from which to acquire a video file. This can be a simple HTTP endpoint as well as something such as a Microsoft Azure™ address or other cloud reference. The multiple of such is also possible and would result in multiple tasks to be scheduled, so things can convert in parallel. A backend processor might create an SID and return it to the caller and then a worker starts, fetches the file and writes it to storage. Conversion (if needed) and completion are applied as in the upload scenario.

Streaming

For streaming, the SID gets created on job start, is passed along the pipeline launch request, and the pipeline gets executed by the analytics processor server, receiving video via RTSP, for example. A recorder node (to be created, a chunking VideoFileWriter so to speak) might write clips to the SID-determined directory in the storage.

Any thumbnails created in the pipeline can also be placed into storage via simply creating SIDs (and by that forming the storage path) and then making sure they are sent along in the objects data stream.

Triggers

Queries should also be able to run on a scheduled basis, or right at stream intake time. This can involve event stream processing, rather than running queries against a database, but it would allow for sending alerts, such as when a given criteria is met (e.g., as soon as cars of a certain color and make are detected). More complex scenarios can of course also be implemented in pipelines, for which specific events or common events with specific tags will then trigger things.

UI Components

An example UI component might have functionality to:

Create jobs: select source type and the necessary parameters

List jobs, show their status (progress, completion, stats, etc.)

Pause (if watching) or delete jobs

Provide a query interface for the results of one or many jobs, perhaps for compound querying Provide an admin panel for user accounts, access rights, storage, etc.

Analytics Data

While the analytics processor server runs a pipeline, it can yield messages with common data to the backend processor. These can be sent back in real-time or serialized in a file first and then consumed later. The following message primitives might be defined: status, frames, object updates, and events.

Status

Status messages are issued by the currently executing pipeline. Most likely these messages will be sent over the API channel only, reporting things such as progress, issues and completion. The latter is useful for the backend processor or the analytics processor server control logic, to know as soon as possible that a new pipeline run can be scheduled.

Frames

For each frame analyzed, the processor outputs a collection of locations (such as bounding boxes) associated with objects. These associations can either use object identifiers, or they may contain the object data itself, e.g., when there is no tracking happening. Other frame data might include timestamp (relative or absolute) and number (logical or physical).

Object Updates

Objects might have well known fields such as unique IDs, types and attributes (depending on the types), as well as fields such as confidence level. The detectors or pipelines respectively might change their decision over time or add more information. Thus, object data need not be complete until the end of appearance and there might be updates in the data stream, which the backend processor then needs to accumulate at database insertion time (or just update existing records).

Events

Analytics pipelines might generate events by running non-exposed data through nodes which yield very specific information (like "vehicle left the gate"). Such data can also be generated based on object and frame data, yet it might often be preferable to do the detection on the very bottom.

Analytics Processor

The system described can be split between an actual analytics processor process itself and a "gate" process that integrates the analytics processor process into the rest of the infrastructure. The gate ensures that the process is up and restarted if necessary, and also implements things that are easier to implement in Node.js, e.g., passing data over to a search process. The analytics processor gate can be well-defined so the backend processor can interact with it.

Loading of pipelines might be constrained on a per-customer basis in a multi-tenant system. There might be an admin interface to list existing pipelines running. There might be functionality to receive result messages at emission time, depending on the actual pipeline run.

Backend Processor

The backend processor can be a client-server backend that might include these elements:

(1) Main module launching the essentials, such as logging, database setup, etc.

(2) Job Manager, for managing a state that gets persisted, for running some scheduled tasks for maintenance, etc.

(3) Query, for getting the requests from the UI and running queries on the search expression. This element might also be responsible to extract the media that results from the search. A simple case is that the UI issues a query and then passes it onto the query element with little or no translation or transformation.

(4) Media serving, for when video and images (thumbnails) are requested; this would be the serving point for such.

(5) Data storage, since the backend processor is not necessarily stateless. This can track which jobs are running, deal with configuration, user data, etc. This can be a database, in-memory storage and configuration file backed, or other configurations.

Search

A search process takes in analytics data, in streaming format and allows it to be queried, both in real-time and on-demand. There might be two ways of interfacing with it. Same as with an analytics processor this will be a "gate" which defines both data input and the query interaction.

Scaling

The gates to the analytics processor server and search might be abstracted enough though, so that a completely different way to run and manage them is possible. This can be a distributed event stream processing solution, wherein the backend processor is agnostic as to the form, talking to an analytics processor gate, which then is backed by a single, local instance, or in a scaled implementation where the request would go to a worker node.

As stateful as the backend processor is, it might be scalable by using design from web servers. Load balancing for UI requests might be used.

Hardware Example Details

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 13:
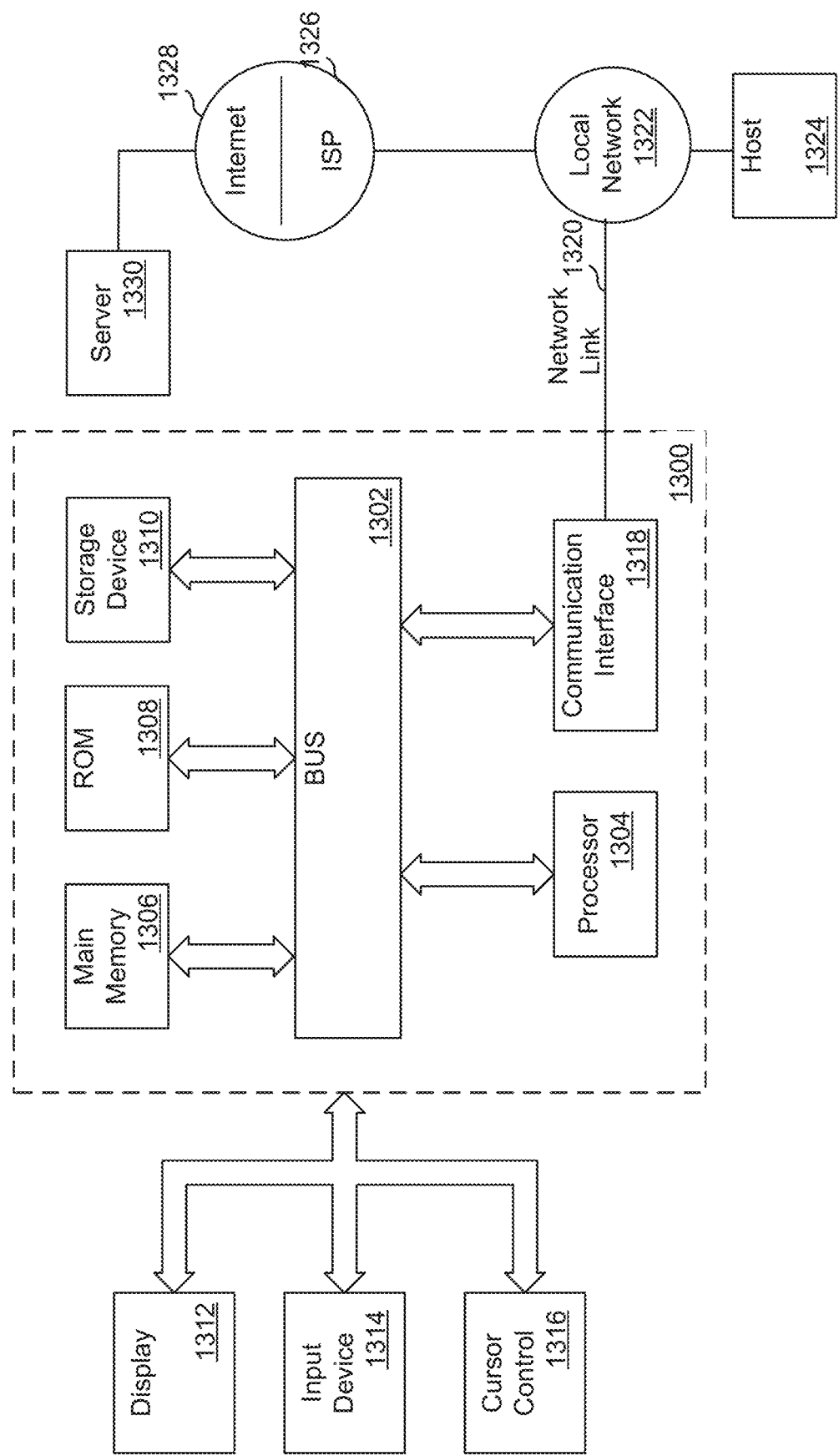
FIG. 13 is a block diagram that illustrates a computer system upon which an embodiment of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a computer monitor, for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a network connection. A modem or network interface local to computer system 1300 can receive the data. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322, and communication interface 1318. The received code may be executed by processor 1304 as it is received, and/or stored in storage device 1310, or other non-volatile storage for later execution.

Figure 14:
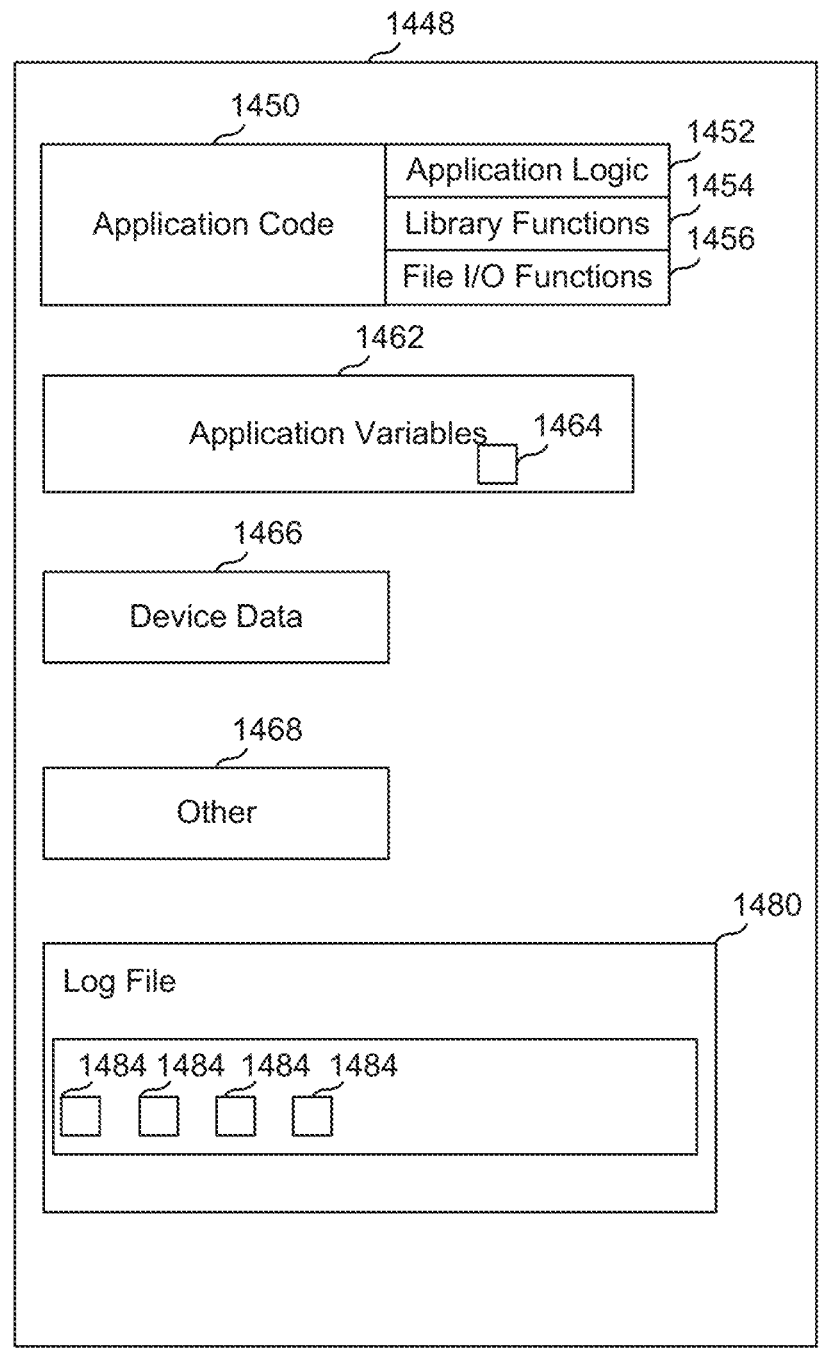
FIG. 14 is a simplified functional block diagram of a storage device having an application that can be accessed and executed by a processor in a computer system.

FIG. 14 is a simplified functional block diagram of a storage device 1448 having an application that can be accessed and executed by a processor in a computer system. The application can be one or more of the applications described herein, running on servers, clients or other 1468 platforms or devices. Storage device 1448 can be one or more memory devices that can be accessed by a processor and storage device 1448 can have stored thereon application code 1450 that can be configured to store one or more processor readable instructions. The application code 1450 can include application logic 1452, library functions 1454, and file I/O functions 1456 associated with the application.

Storage device 1448 can also include application variables 1462 that can include one or more storage locations configured to receive input variables 1464. The application variables 1462 can include variables that are generated by the application or otherwise local to the application. The application variables 1462 can be generated, for example, from data retrieved from an external source, such as a user or an external device or application. The processor can execute the application code 1450 to generate the application variables 1462 provided to storage device 1448.

One or more memory locations can be configured to store device data 1466. Device data 1466 can include data that is sourced by an external source, such as a user or an external device. Device data 1466 can include, for example, records being passed between servers prior to being transmitted or after being received.

Storage device 1448 can also include a log file 1480 having one or more storage locations 1484 configured to store results of the application or inputs provided to the application. For example, the log file 1480 can be configured to store a history of actions.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of synchronizing two or more video streams, comprising:
    obtaining a plurality of video streams;
    using an analytics processor having a correlation stage to identify similarities among the video streams of the plurality of video streams;

distill cross-populated information that associate at least one frame from at least two video streams and relate to location and/or time of video capture of content of the at least two video streams;

compute confidence degrees for the cross-populated information; and process a mesh of cross-populated information to increase confidence degrees of the cross-populated information, wherein using the analytics processor to identify similarities among the video streams comprises:

representing references to video inputs using a markup language; and representing actions to be taken on the video inputs, wherein the actions are represented by data stored in a data object in the markup language.

2. The method of claim 1, wherein the cross-populated information corresponds to a presence of a person in each of the at least two video streams.

3. The method of claim 1, wherein the cross-populated information corresponds to a presence of a same timepiece in each of the at least two video streams.

4. The method of claim 1, wherein the cross-populated information corresponds to a presence of sounds or speech that occur in each of the at least two video streams.

5. The method of claim 1, wherein the cross-populated information corresponds to a presence of a particular vehicle type in each of the at least two video streams.

6. The method of claim 1, wherein the cross-populated information corresponds to a presence of a particular license plate in each of the at least two video streams.

7. The method of claim 1, wherein the cross-populated information corresponds to a presence of a place in each of the at least two video streams.

8. The method of claim 1, wherein the cross-populated information corresponds to a presence of a roadway in each of the at least two video streams.

9. The method of claim 1, wherein the cross-populated information corresponds to a presence of a particular face in each of the at least two video streams.

10. The method of claim 1, wherein the cross-populated information corresponds to a presence of a particular object in each of the at least two video streams.

11. The method of claim 10, further comprising adding a notification of the particular object to a directory of a watch system.

12. The method of claim 1, wherein the cross-populated information corresponds to a presence of a label in each of the at least two video streams.

13. The method of claim 1, wherein the cross-populated information corresponds to a presence of a door or gate in each of the at least two video streams.

14. The method of claim 1, wherein the cross-populated information corresponds to a presence of a building in each of the at least two video streams.

15. The method of claim 1, wherein the cross-populated information comprises sensor data.

16. The method of claim 1, wherein the sensor data comprises Exif data.

17. The method of claim 1, wherein the analytics processor comprises a plurality of processing pipelines.

18. The method of claim 1, wherein using the analytics processor to identify similarities among the video streams comprises:

representing references to video inputs using a markup language; and representing actions to be taken on the video inputs, wherein the actions are represented by data stored in a data object in the markup language.

19. The method of claim 1, wherein using the analytics processor to identify similarities among the video streams further comprises:

processing the video inputs according to the actions; and passing data to detectors and classifiers according to a node structure represented in the data object in the markup language.

20. The method of claim 19, wherein the actions comprise physical processes.

21. The method of claim 20, wherein the physical processes comprise at least one of a deep neural network, a detector, a classifier, or a frame conversion.

22. The method of claim 1, wherein at least one video stream of the plurality of video streams is in a H.264/AAC format.

23. The method of claim 1, wherein the markup language is organized as a graph of nodes and edges.

24. The method of claim 23, wherein a node of the graph of nodes and edges comprises a nested graph.

25. The method of claim 23, wherein the graph of nodes and edges includes a terminal node that correspond to a physical process.

26. The method of claim 25, wherein the physical process includes a data transformation process, a deep neural network, or a frame conversion.

27. The method of claim 26, wherein the data transformation process is performed by the analytics processor, wherein the analytics processor is processing a markup language file that includes the graph of nodes and edges, wherein at a runtime, the analytics processor receives the markup language file that includes the graph of nodes and edges.

* * * * *